(12) United States Patent
McKay

(10) Patent No.: US 7,283,793 B1
(45) Date of Patent: Oct. 16, 2007

(54) PACKAGE FILTER AND COMBINER NETWORK

(75) Inventor: Tom McKay, Felton, CA (US)

(73) Assignee: Broadcom Corporation, Irvine, CA (US)

( * ) Notice: Subject to any disclaimer, the term of this patent is extended or adjusted under 35 U.S.C. 154(b) by 636 days.

(21) Appl. No.: 10/262,336

(22) Filed: Sep. 30, 2002

Related U.S. Application Data

(60) Provisional application No. 60/381,387, filed on May 15, 2002.

(51) Int. Cl.
*H04B 1/44* (2006.01)

(52) U.S. Cl. ............................ 455/83; 455/78; 455/80; 333/25; 333/103

(58) Field of Classification Search .................. 455/78, 455/80, 82–83, 280–282, 284–293; 333/101–103, 333/25, 262, 204, 185
See application file for complete search history.

(56) References Cited

U.S. PATENT DOCUMENTS

| 5,172,082 | A | | 12/1992 | Livingston et al. | |
|---|---|---|---|---|---|
| 5,584,053 | A | | 12/1996 | Kommrusch et al. | |
| 5,673,003 | A | | 9/1997 | Zocher | |
| 5,867,072 | A | | 2/1999 | Logothetis | |
| 6,009,314 | A | * | 12/1999 | Bjork et al. | .................. 455/83 |
| 6,040,745 | A | | 3/2000 | Tanaka et al. | |
| 6,147,571 | A | * | 11/2000 | Kitazawa et al. | ............ 333/126 |
| 6,249,687 | B1 | * | 6/2001 | Thomsen et al. | ......... 455/553.1 |
| 6,278,340 | B1 | | 8/2001 | Liu | |
| 6,294,965 | B1 | | 9/2001 | Merrill et al. | |
| 6,441,696 | B1 | | 8/2002 | Westberg | |
| 6,466,770 | B1 | | 10/2002 | Griffith et al. | |
| 6,470,173 | B1 | * | 10/2002 | Okada et al. | .................. 455/82 |
| 6,670,866 | B2 | | 12/2003 | Ella et al. | |
| 6,735,418 | B1 | * | 5/2004 | MacNally et al. | ............. 455/78 |
| 6,828,881 | B2 | * | 12/2004 | Mizutani et al. | ............ 333/204 |

(Continued)

OTHER PUBLICATIONS

Choonsik Cho, "A New Design Procedure for Single-Layer and Two-Layer Three-Line Baluns", IEEE Transactions On Microwave Theory And Techniques, vol. 46, No. 12, Dec. 1998.

*Primary Examiner*—Matthew D. Anderson
*Assistant Examiner*—Tuan Tran
(74) *Attorney, Agent, or Firm*—Sterne, Kessler, Goldstein & Fox PLLC

(57) ABSTRACT

A transceiver front end circuit includes an antenna terminal capable of being coupled to an antenna. A first balun circuit has a single input that is coupled to the antenna terminal, and a pair of balanced outputs coupled to a corresponding pair of balanced receiver inputs. The first balun circuit matches an input impedance of the pair of balanced receiver inputs and substantially phase shifts the input reflection coefficient of the pair of balanced receiver inputs by about 180-degrees. A second balun circuit has a single output coupled to the antenna terminal and a pair of balanced inputs coupled to a corresponding pair of balanced transmitter outputs. The second balun circuit matches an output impedance of the pair of balanced transmitter outputs and substantially phase shifts the output reflection coefficient of the pair of balanced transmitter outputs by about 180-degrees. The first balun circuit and the second balun circuit can be contained within a single package. A first shunt switch can be coupled across the pair of receiver inputs. A second shunt switch can be coupled across the pair of transmitter outputs.

23 Claims, 13 Drawing Sheets

U.S. PATENT DOCUMENTS

| | | |
|---|---|---|
| 6,844,792 B1 | 1/2005 | Koeppe et al. |
| 6,982,609 B1 | 1/2006 | McKay et al. |
| 2002/0034934 A1 | 3/2002 | Watanabe et al. |
| 2002/0163375 A1* | 11/2002 | Wu et al. ................... 327/356 |

* cited by examiner

PACKAGE FILTER AND COMBINER NETWORK

CROSS REFERENCE TO RELATED APPLICATIONS

This application claims priority from U.S. Provisional Patent Application No. 60/381,387 filed on May 15, 2002 and entitled "Package Filter Combiner Network," by Inventor Tom McKay, which is incorporated herein by reference in its entirety.

BACKGROUND OF THE INVENTION

1. Field of the Invention

The present invention relates generally to transceiver front-end circuits and more specifically to a highly integrated transceiver front-end circuitry that couples a single antenna port to both a balanced receiver input and a balanced transmitter output.

2. Description of the Related Art

Highly integrated radios typically have differential inputs on the receiver and differential outputs on the transmitter. The differential inputs on the receiver allow the receiver to reject common mode signals (e.g., noise) and variations. By way of example, a differential input can detect input differential signals that a single ended (i.e., a non-differential) receiver might not be able to discriminate from a noise in the common mode. Similarly, a differential output on the transmitter can more efficiently transmit the power (e.g., biasing current) that is applied to the output power amplifier stages of the transmitter.

FIG. 1 shows a prior art, time-division duplex front-end circuit 100 for coupling a differential receiver 114 and a differential transmitter 138 to a single antenna port 101. The receiver 114 and the transmitter 138 each have different requirements for optimum performance. The input to the receiver 114 must be optimized impedance for both the best conjugate match and the best noise performance. The receiver impedance matching is typically provided by a receiver matching network 108.

Ideally, the antenna 102 is matched to the receiver 114 to produce the optimum small signal transfer by tuning the receiver inputs 112p, 112n and the antenna 102 to achieve a conjugate match. If the antenna 102 and the receiver inputs 112p, 112n do not have a conjugate match, then the performance of the receiver 114 can be degraded. By way of example, the gain of the receiver 114 may be reduced and the noise produced by the receiver can also be increased if the antenna 102 is not properly matched to the receiver inputs 112p, 112n. For optimum receiver performance, the receiver input stages (i.e., the low noise amplifier (LNA) 112) should be designed so that the conjugate match and best noise match are at the same impedance. If the conjugate match and best noise match are at the same impedance then the receiver matching network 108 can be specifically designed to the required impedance.

The output of the transmitter 138 must also be impedance matched to the antenna port 101 to provide the most efficient conversion of the bias current applied to the transmitter power amplifier 136 to output transmit power. Typically, a transmitter matching network 134 matches the impedance of the output of the transmitter 138. Unfortunately, the receiver 114 input impedance and the transmitter 138 output impedance are typically not the same and therefore separate matching networks 108, 134, respectively, are required.

It is also desirable to disconnect the receiver 114 input from the antenna 102 when the transmitter is transmitting so that the transmit power is not applied directly to the input of the receiver. Applying the full transmit output power to the input amplifiers (e.g., low noise amplifier (LNA) 112) of the receiver 114 can damage the LNA 112 or at the very least reduce the overall receiver sensitivity (e.g., ability to discriminate between noise and signal) by introducing large amplitude harmonic noise to the receiver 114. Further, if the receiver 114 is not disconnected from the antenna during transmit mode, the amount of transmitter power transferred to the antenna can be reduced due to loading of the receiver 114 on the transmitter 138. If the transmitter 138 is coupled to the antenna 102 during the receive mode, the transmitter 138 can also "load" the receiver circuit which can reduce the net input signal to the receiver 114. For the above reasons, a transmit/receive switch (T/R switch) 104 is typically included to switch the antenna 102 between the receiver 114 and the transmitter 138.

A balun is a circuit that includes a transmission line transformer for converting balanced input to unbalanced output or vice versa. A balun may or may not provide wide frequency range impedance transformation depending upon the configuration used. The receiver balun 106 converts the unbalanced, single pole antenna 102 to a differential signal for the receiver 114. The transmitter balun 130 converts the balanced transmit signal to an unbalanced signal for the unbalanced, single pole antenna 102. The receiver balun circuit 106 and the transmitter balun circuit 130 are typically transformers or other types of inductive devices that can match the impedance of the unbalanced antenna port 101 to the balanced impedance of the receiver 114 and the transmitter 138, respectively.

Referring again to FIG. 1, the receive path begins with the receive signal entering the antenna 102. The antenna 102 is coupled to the single antenna port 101 that is coupled to the transmit/receive (TR) switch 104 at the antenna terminal 104A. The TR switch 104 has two terminals 104B, 104C opposite the antenna terminal 104A. The input 106A of a receiver balun 106 is coupled to terminal 104B. The differential outputs 106n, 106p of the receiver balun 106 are coupled to the corresponding differential inputs of the receiver matching network 108. The differential outputs 108n, 108p of the receiver matching network 108 are coupled to corresponding differential inputs 112n, 112p of the receiver LNA 112. The receiver LNA 112 represents the first stage or stages of the receiver portion 114 of the transceiver 120.

In the transmission signal path the differential transmitter signal is output from the transmitter PA 136 outputs 136n, 136p. The transmitter PA 136 represents the final output stage or stages of the transmitter portion 138 of the transceiver 120. The differential transmitter outputs 136n, 136p are coupled to the corresponding differential inputs 134n, 134p of the transmitter matching network 132. The differential outputs of the transmitter matching network 132 are coupled to the corresponding differential inputs 130n, 130p of the transmitter balun 130. The unbalance output 130A of a transmitter balun 130 is coupled to terminal 104C of the TR switch 104.

The TR switch 104 provides the ability to connect only one signal path (transmit or receive) at a time to the antenna so that the transmitter 138 and the receiver 114 can share a common antenna. For example, in the receive mode, as shown, the TR switch 104 couples signals coming in the antenna 102 to the input 106A of a receiver balun 106. Also in the receive mode, transmit signal path (i.e. from the PA 136, through the transmitter matching network 132 and through the transmitter balun 130) is not coupled to the antenna 102. In this way the TR switch 104 prevents the transmitter 138 from transmitting into the receiver 114 or from reducing (loading down) the net receive signal input to the receiver 114.

Conversely, in transmit mode, the TR switch 104 is in the transmit position (not shown) and the transmit signals can be coupled from the PA 136, through the transmitter matching network 132, through the transmitter balun 130, and across terminal 104C to terminal 104A of the TR switch 104 and out the antenna 102.

In conventional, highly integrated radio, the TR switch 104 is located off the package that contains the front-end circuit 100. The TR switch is located off the package because of size limitations and because the TR switch is an active component (e.g., transistor, diode or integrated circuit). Further, the typical TR switch 104 can be constructed from PIN diodes and can be very inefficient because a solid state TR switch 104 requires a high current to produce a low resistance signal path in at least one of the receive signal path or the transmit signal path. High current use is not optimum for mobile applications such as cellular telephones or Bluetooth applications. Further, because the TR switch is located off package, then the parasitic components of the connections between the TR switch 104 and the package can vary from design to design. This variation requires either that the matching networks 108, 132 must be detuned to compensate for the range of the variation thereby resulting in a less than optimum match with the receiver 114 and the transmitter 138. Alternatively, the matching networks 108, 132 will typically require specific tuning to compensate for the manufacturing variation. Either option is less than optimum as the resulting front end circuit 100 will not be fully optimized and/or will require individual application optimization.

Another conventional transceiver front-end circuit includes a single balun that is used by both the receiver and transmitter. Another conventional transceiver front-end circuit includes a PIN diode circuit in series and shunt combined with an external balun. PIN diodes require significant currents that therefore reduce power efficiency and are therefore less than optimal for mobile/portable applications. A bias current of several mA may be required to achieve low resistance current flow across a PIN diode.

Conventional transceiver front-end circuits typically use substantially complicated PIN switch configurations. One such configuration combines parallel connections of the PA and LNA connection and an external balun. Another conventional transceiver front-end circuit connects the PA outputs and the LNA inputs, with parasitic absorption, and an external balun. In this version, the PA acts as a capacitance when the PA is turned off so that the LNA port can effectively receive.

Yet another conventional transceiver front-end circuit has separate paths, which simplified the application that required an external LNA topology. This approach also requires on-board tuning because exact tuning will be dependent on the application circuit, the dielectric materials variation, component and assembly variations, etc. On-board tuning also increases time-to-market in many applications.

In view of the foregoing, there is a need for a front end circuit that provides efficient switching between transmit mode and receive mode, without an off package TR switch and provides optimized matching for both the receiver inputs and the transmitter outputs.

SUMMARY OF THE INVENTION

Broadly speaking, the present invention fills these needs by providing a transceiver front-end circuit that is fully contained within the package. It should be appreciated that the present invention can be implemented in numerous ways, including as a process, an apparatus, a system, computer readable media, or a device. Several inventive embodiments of the present invention are described below.

One embodiment includes a system and a method of switching between a receive mode and a transmit mode that includes coupling an input of a first balun circuit to an antenna terminal and coupling a pair of outputs of the first balun circuit to a corresponding pair of balanced receiver inputs. The first balun circuit matching an input impedance of the pair of balanced receiver inputs and substantially phase shifting the input reflection coefficient of the pair of balanced receiver inputs by about 180-degrees. An output of a second balun circuit is also coupled to the antenna terminal and a pair of inputs of the second balun circuit are coupled to a corresponding pair of balanced transmitter outputs. The second balun circuit matching an output impedance of the pair of balanced transmitter outputs and substantially phase shifting the output reflection coefficient of the pair of balanced transmitter outputs by about 180-degrees. The first balun circuit and the second balun circuit can be contained within a single package. The pair of receiver inputs can be shorted during a transmit mode. Shorting the pair of receiver inputs can include closing a first shunt switch that is coupled across the pair of receiver inputs. The pair of transmitter outputs are shorted during a receive mode. Shorting the pair of transmitter outputs can include closing a second shunt switch that is coupled across the pair of transmitter outputs.

One embodiment includes a transceiver front end circuit that includes an antenna terminal capable of being coupled to an antenna. A first balun circuit has a single input that is coupled to the antenna terminal, and a pair of balanced outputs coupled to a corresponding pair of balanced receiver inputs. The first balun circuit matches an input impedance of the pair of balanced receiver inputs and substantially phase shifts the input reflection coefficient of the pair of balanced receiver inputs by about 180-degrees. A second balun circuit has a single output coupled to the antenna terminal and a pair of balanced inputs coupled to a corresponding pair of balanced transmitter outputs. The second balun circuit matches an output reflection coefficient of the pair of balanced transmitter outputs and substantially phase shifts the output impedance of the pair of balanced transmitter outputs by about 180-degrees. The first balun circuit and the second balun circuit can be contained within a single package. A first shunt switch can be coupled across the pair of receiver inputs. A second shunt switch can be coupled across the pair of transmitter outputs.

A transceiver front-end circuit includes an antenna terminal capable of being coupled to an antenna and a first balun circuit, a second balun circuit and a first shunt switch and a second shunt switch. The first balun circuit includes a single input coupled to the antenna terminal and a pair of balanced outputs coupled to a corresponding pair of balanced receiver inputs. The first balun circuit also includes a receiver impedance matching network that matches an input impedance of the pair of balanced receiver inputs and substantially phase shifts the receiver input reflection coefficient by about 180-degrees. The second balun circuit includes a single output coupled to the antenna terminal and a pair of balanced inputs coupled to a corresponding pair of balanced transmitter outputs. The second balun circuit also includes a transmitter impedance matching network that matches an output impedance of the pair of balanced transmitter outputs and substantially phase shifts the output reflection coefficient of the transmitter outputs by about 180-degrees. The first balun circuit and the second balun circuit are contained within a single package. The first shunt switch is coupled across the pair of receiver inputs and the second shunt switch is coupled across the pair of transmitter outputs.

In one embodiment, the first shunt switch and the second shunt switch are CMOS switches.

The single package can be a low temperature co-fired ceramic (LTCC) package.

The first shunt switch can be included in the pair of receiver inputs. The second shunt switch can be included in the pair of transmitter outputs. The second shunt switch can include at least one output stage of a transmitter output amplifier.

In one embodiment, the front-end circuit can also include a filter including a filter input coupled to the antenna terminal, and a filter output coupled to the input of the first balun circuit and the output of the second balun circuit. The filter can be located within the single package. The filter can attenuate undesired signals at least about 35 decibels. The filter can be a strip line filter.

In one embodiment, the antenna terminal has a about 50 ohm impedance.

In one embodiment, if the first shunt switch is closed the input to the first balun circuit has an input impedance substantially greater than about 50 ohms. If the first shunt switch is open the input to the first balun circuit has an input impedance substantially equal to about 50 ohms.

In one embodiment, if the second shunt switch is open the output of the second balun circuit has an impedance substantially equal to about 50 ohms. If the second shunt switch is closed the output of the second balun circuit has an impedance is substantially greater than 50 ohms.

Another embodiment is a method of switching between a receive mode and a transmit mode including coupling an input of a first balun circuit to an antenna terminal and coupling a pair of outputs of the first balun circuit to a corresponding pair of balanced receiver inputs. The first balun circuit can include a receiver impedance matching network that matches an input reflection co-efficient of the pair of balanced receiver inputs and substantially phase shifts the input impedance of the pair of balanced receiver inputs by about 180-degrees. The method also includes coupling an output of a second balun circuit to the antenna terminal and coupling a pair of inputs of the second balun circuit to a corresponding pair of balanced transmitter outputs. The second balun circuit can include a transmitter impedance matching network that matches an output impedance of the pair of balanced transmitter outputs and substantially phase shifts the output reflection co-efficient of the pair of balanced transmitter outputs by about 180-degrees. The first balun circuit and the second balun circuit can be contained within a single package. The pair of receiver inputs are shorted during a transmit mode such as by closing a first shunt switch coupled across the pair of receiver inputs. The pair of transmitter outputs are shorted during a receive mode such as by closing a second shunt switch coupled across the pair of transmitter outputs.

In one embodiment, if the first shunt switch is closed the input to the first balun circuit has an impedance substantially greater to an impedance of the antenna terminal. If the first shunt switch is open the input to the first balun circuit has an impedance substantially equal an impedance of the antenna terminal. If the second shunt switch is closed the output of the second balun circuit has an impedance is substantially greater than an impedance of the antenna terminal. If the second shunt switch is open the output of the second balun circuit has an impedance substantially equal to an impedance of the antenna terminal.

In another embodiment, a circuit for isolating an electrostatic discharge (ESD) from a receiver input includes a circuit structure having an input coupled to an antenna and having an output coupled to at least one input of a receiver. The circuit structure being within a package and oriented such that the circuit structure is capable of substantially coupling an ESD from the antenna to ground.

One advantage is that the impedance of PA and LNA ports can be optimized for noise figure and power match. Shunt switches are very easy to implement in CMOS. Using shunt switches also increases flexibility in the system and limits the chance of junction turn-on and other side effects of using series switches. The switches used are less complicated than the prior art. We have no external Balun.

Another advantage is that the topology is selected for best noise figure or sensitivity and, in terms of power match. Using this approach also allows presenting the correct impedance so that the circuit is not constrained on how to present the correct impedance for the LNA or the PA (depending on direction of flow). These problems have been separated and can therefore be independently optimized.

An additional advantage is that a quarter-wave stub is used. By biasing (to present the PA drain current and transmission line stub tuning) can achieve the correct impedance levels and tune the LNA properly. The bias group can be presented to the PA without RF signal loss and not disrupt the operation of the circuit. When the shunts are shorted, this goes away or is irrelevant to RF signals since it is the quarter-wave signal. Therefore, acting as a by-pass capacitor on-chip.

Yet another advantage of the present invention is that on-board tuning is not required, which is a time-to-market benefit. Optimum power and efficiency can be achieved without need of on-board tuning.

Combining a single-ended LNA and the Balun within the package, provides the differential input on chip, which is required for good sensitivity relative to substrate noise on chip.

An integrated antenna filter in a high-Q (quality factor), low-loss package environment makes it possible to create a strip line filter that achieves the PCS, cellular and other bands rejection.

The combination of filter/balun/switch means that the design is optimized to achieve superior functionality or reject the low end (e.g., providing a band-pass function) in combination creates a front end that is fairly sensitive to the band of interest.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE EXEMPLARY EMBODIMENTS

Figure 1:
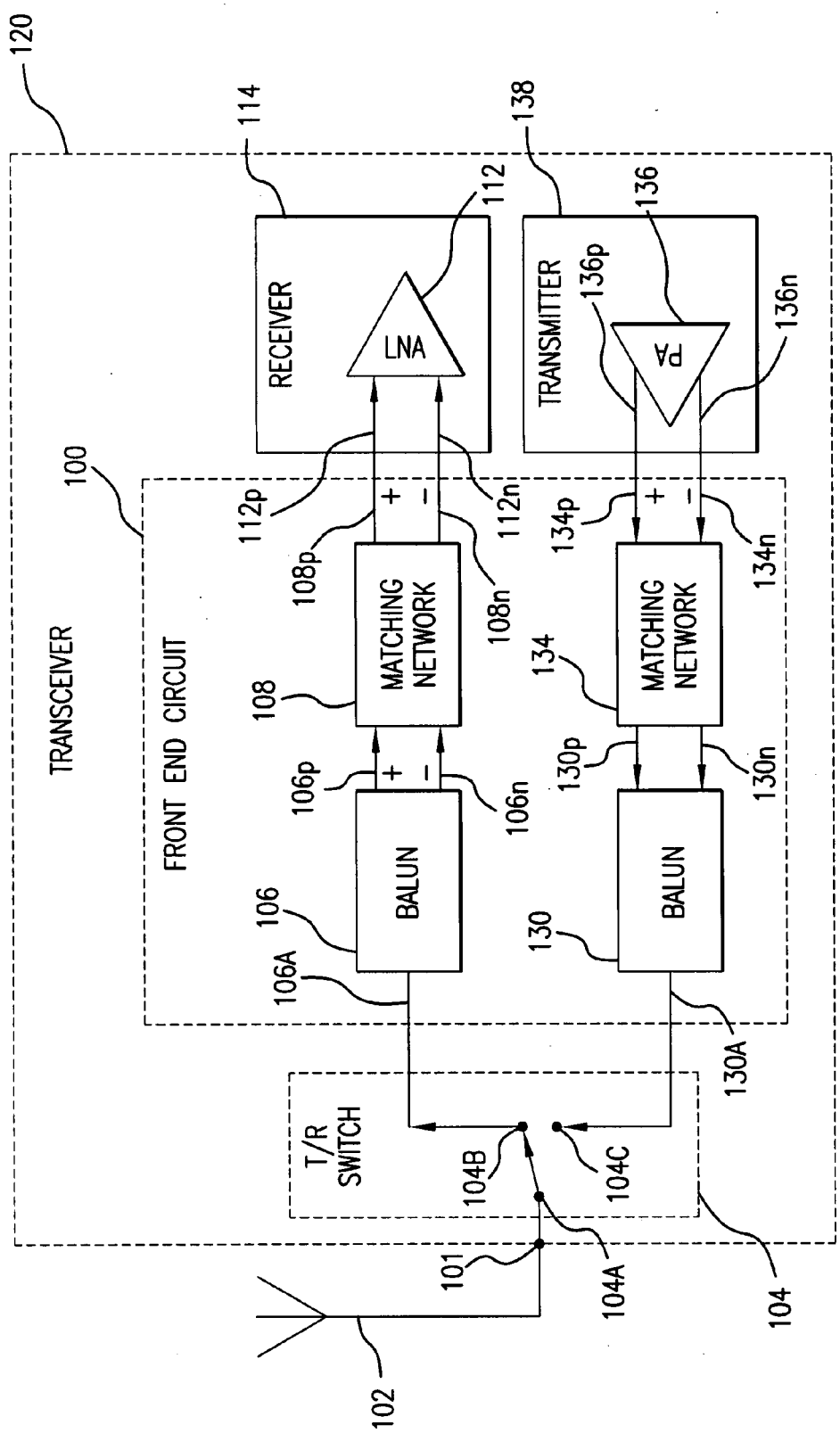
FIG. 1 shows a prior art front-end circuit for coupling a differential receiver and a differential transmitter to a single antenna port.

Several exemplary embodiments of a packaged, transceiver front-end circuit will now be described. It will be apparent to those skilled in the art that the present invention may be practiced without some or all of the specific details set forth herein Modern portable transceiver systems are constantly being improved upon by incorporating ever-increasing capabilities, reduced power consumption and reduced physical size. The additional capabilities and reduction in power consumption are often achieved through increased integration. The resulting highly integrated transceivers must also have increased performance e.g., improved noise performance, improved receiver sensitivity and increased transmit power efficiency, while also providing a reduced cost and other improvements. Highly integrated transceivers are used in many common applications that people can touch, hold in their hands, put in their pockets and briefcases, on their desks, in their houses and in new applications as yet undiscovered. Some examples include wireless telephones (e.g., cellular, PCS (Personal Communications System), and other wireless portable telecommunication systems), wireless networking systems (e.g., wireless personal area networks, wireless local and wide area networks, Bluetooth, and IEEE 802.11 specification and other wireless networking, communication and control systems) and any other compact transceiver applications.

Various embodiments of the present invention are described. One embodiment includes a system and method for time-multiplexing balanced signals to a single antenna port. Shunt switches can be used rather than using series switches or a combination of series and shunt switches.

One embodiment includes a balun circuit within the same packaging as the receiver/transmitter front-end circuitry. Conventional balun circuits are external to the packaging that includes the transceiver front-end circuitry. Including the balun circuit within the same packaging as the transceiver front-end circuitry substantially eliminates parasitic losses.

One embodiment optimizes the impedance of the low noise amplifier (LNA) input on the receiver and the power amplifier (PA) output ports for noise figure and power match. This allows the drain DC power supply to be independently presented to the PA without RF signal loss or operational circuit disruption.

One embodiment substantially eliminates on-board tuning that is typically required on conventional transceiver front-end circuitry.

One embodiment provides a transceiver front-end circuitry that substantially increases sensitivity in the presence of substrate noise on-chip. In addition, the transceiver front-end circuitry can be very sensitive to the band of interest and without degrading the performance of the LNA/mixer due to signals from cellular or Personal Communication System (PCS) phones coming into the receiver.

One embodiment increases the power efficiency so that the transceiver front-end circuitry can be more efficiently used in portable applications such as cellular telephones.

In one embodiment, the combination of the three elements (i.e., a filter, one or more balun and one or more shunt switches) solves many of the transceiver front-end circuit issues described above. Additionally, combining the three elements in a single package can achieve excellent functionality and can allow enhanced rejection of the low end of the band. One embodiment of the present invention provides a band-pass function.

In one embodiment, the topology was selected for the best for noise-figure sensitivity. Using this approach, with consideration for power match presented the correct impedance. Presenting the correct impedance in turned, allowed presenting the correct impedance for the LNA or the PA (depending on direction of power flow). Therefore the impedance presented to the LNA or the PA are no longer linked together and have been separated, and therefore can be optimized independently.

The present invention also allows use of a quarter-wave stub for biasing the PA. The on-chip capacitor is bypassed and the bias voltage is presented to the PA without RF signal loss, which allows the circuit to operate efficiently.

Figure 2:
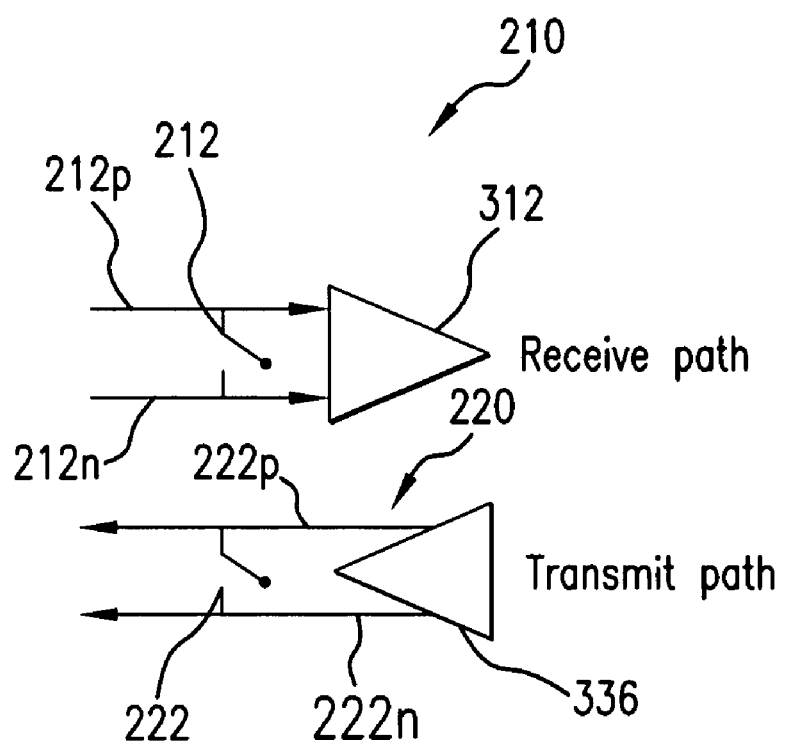
FIG. 2 illustrates a block diagram of a receive signal path and a transmit signal path according to one embodiment of the present invention.

FIG. 2 illustrates a block diagram of a receive signal path 210 and a transmit signal path 220 according to one embodiment of the present invention. A receive path shunt switch 212 is coupled across the two differential receive path inputs 212p, 212n. The receive path shunt switch 212 is open during receive and closed during transmit. Closing the receive path shunt switch 212 effectively couples (i.e., shorts) the two differential receive path inputs 212p, 212n together, thereby substantially nulling any signal applied to the two differential receive path inputs 212p, 212n. As will be discussed in more detail below, closing the receive path shunt switch 212 during transmit efficiently routes the transmit signal from the PA 336 to the antenna 102.

A transmit path shunt switch 222 is coupled across the two differential transmit path outputs 222p, 222n. The transmit path shunt switch 222 is open during transmit and closed during receive. As will be described in more detail below, the receive path shunt switch 212 and the transmit path shunt switch 222 can more effectively and more efficiently perform the functions of the prior art T/R switch such as T/R switch 104 shown in FIG. 1 above but also contain the T/R switch functions within the highly integrated transceiver and package.

Figure 3:
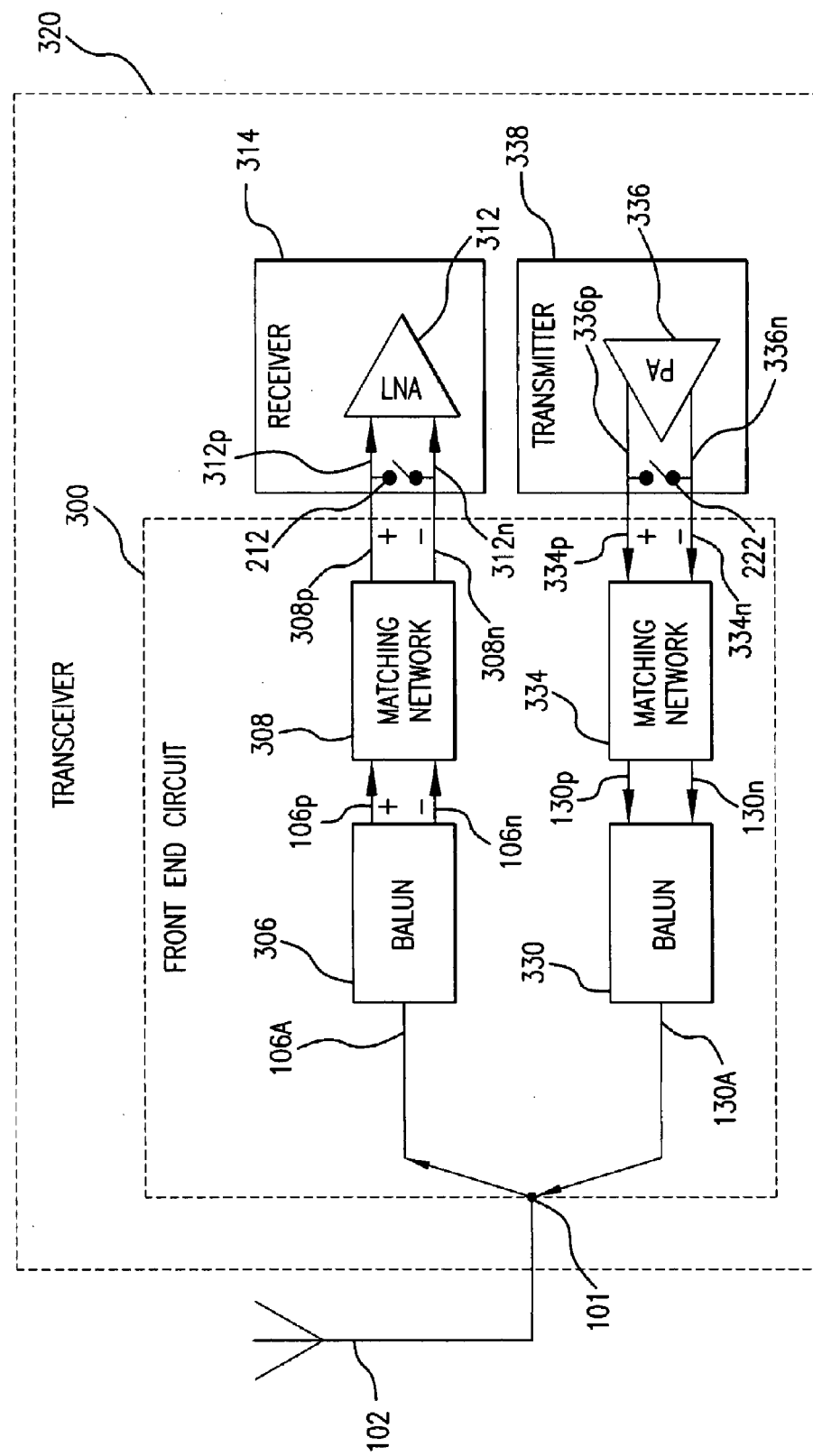
FIG. 3 illustrates a front-end circuit, receiver and transmitter portions of a transceiver according to one embodiment of the present invention.

FIG. 3 illustrates a front-end circuit 300, receiver 314 and transmitter 338 portions of a transceiver 320 according to one embodiment of the present invention. In comparison to the prior art circuits shown in FIG. 1 above, the receive path components (e.g., receiver balun 106, receiver matching network 308 and the receiver 314) are coupled directly to antenna port 101 rather than through a prior art T/R switch such as T/R switch 104. Similarly, the transmit path components (e.g., transmitter 338, transmitter matching network 334, and transmitter balun 330) are coupled directly to antenna port 101 rather than through a prior art T/R switch 104 as shown in FIG. 1 above.

The receiver balun 306 and the transmitter balun 330 can be transformers or other circuits and components such as LC networks and coupled transmission lines. In one embodiment, the receiver matching network 108 provides the best conjugate match and the best noise match for the receiver 314 to provide the best small signal transfer. Similarly, the transmitter matching network 334 provides the optimum power load for the transmitter 338, thereby providing an efficient transmit circuit. Separately optimized receiver matching network 308 and transmitter matching network 334 provides highest efficiency transmit path while also providing a receive path with the greatest sensitivity.

In one embodiment, the receiver balun 306 includes a 90-degree transmission phase shift. The transmitter balun 330 can also include a 90-degree transmission phase shift. The 90-degree phase shift can also provides a 180-degree reflection coefficient phase shift or, equivalently, an impedance inversion. In an impedance inversion, an RF short at one port (e.g., at the positive PA balanced output 336p) is inverted, or converted to an RF open at the opposing port (e.g., at the negative PA balanced input 336n). The functions of the respective 90-degree transmission phase shifts in the receiver balun 306 and the transmitter balun 330 are described in FIGS. 4 and 5 below.

Figure 4:
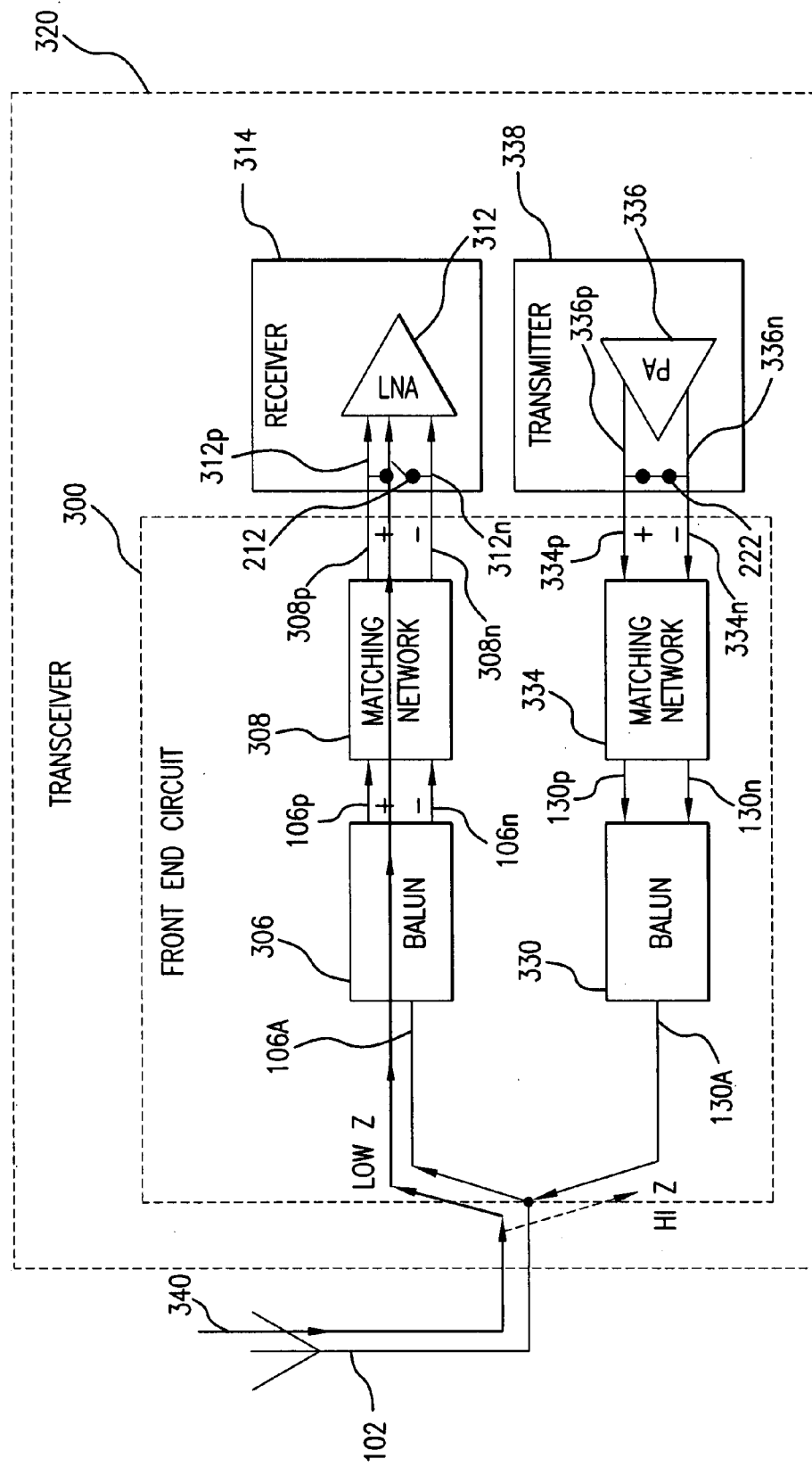
FIG. 4 is a block diagram analysis of the receive signal path of the transceiver according to one embodiment of the present invention.

FIG. 4 is a block diagram analysis of the receive signal path of the transceiver 320 according to one embodiment of the present invention. In the receive mode i.e., during the receive function, the transmit shunt switch 222 is closed. The receive signal is shown by the bold receive signal path line 340. The receive signal 340 enters the antenna 102, passes through the antenna port 101. At the antenna port 101, the majority of the receive signal is coupled toward the receive balun 306. This occurs because the low impedance reflection coefficient of the closed transmit shunt switch is reflected and phase shifted through the 90-degree transmit balun 330. Therefore, at the antennal port 101, the transmit balun input 130A appears to have a very high impedance (HI Z) as compared to the relatively low impedance (Low Z) of the receive balun input 106A. High impedance levels are about 500 ohms or more and relatively low impedance levels are about 50 ohms. The majority of the receive signal 340 is therefore applied to the input 106A of the receive balun 306.

The receive balun 306 converts the unbalanced receive signal 340 to a balanced differential signal and couples the resulting balanced differential signal to the receiver matching network 308. The receiver matching network 308 matches the precise impedance required for the differential inputs 312p, 312n of the LNA 312.

Figure 5:
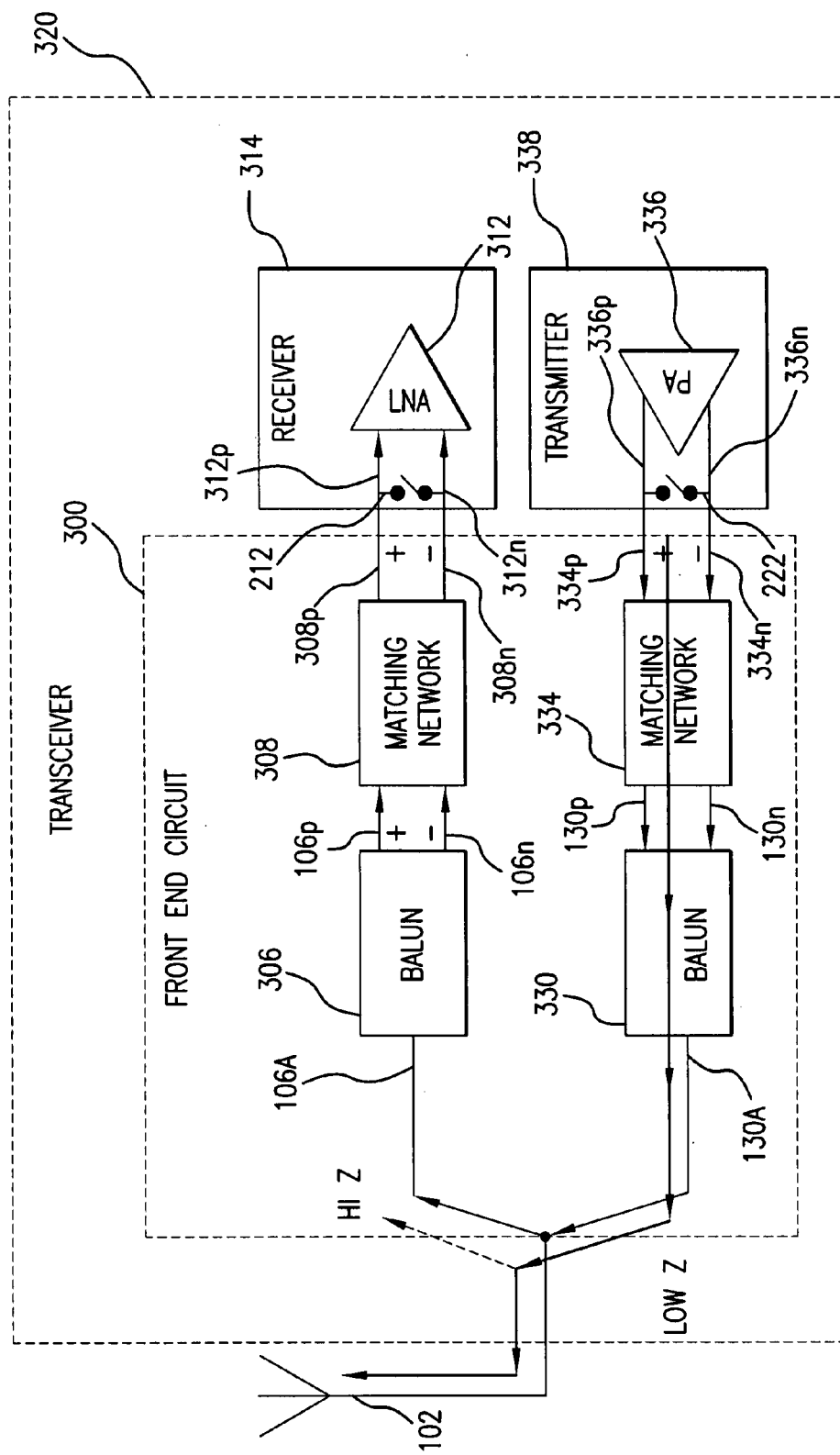
FIG. 5 is a block diagram analysis of the transmit signal path of the transceiver according to one embodiment of the present invention.

FIG. 5 is a block diagram analysis of the transmit signal path of the transceiver 320 according to one embodiment of the present invention. In the transmit mode i.e., during the transmit function, the receive shunt switch 212 is closed. The transmit signal is shown by the bold transmit signal path line 350. The transmit signal 350 is output from the power amplifier (PA) 336 differential outputs 336p, 336n. The transmit signal 350 is coupled to the transmit matching network 334. The transmit matching network 334 matches the precise impedance required for the differential outputs 336p, 336n of the PA 336. The transmit signal is then coupled to the transmit balun 330. The transmit balun converts the balanced differential transmit signal 350 to an unbalanced output transmit signal 352. The unbalanced transmit signal 352 is applied to the antenna port 101.

At the antenna port 101, the majority of the signal is coupled to the antenna 102 because the receive balun input 106A appears as a high impedance. The receive balun input 106A appears as a high impedance because the low impedance reflection coefficient of the closed receive shunt switch 212 is reflected and phase shifted through the 90-degree receive balun 306. Therefore, at the antennal port 101, the receive balun input 106A appears to have a very high impedance (HI Z) as compared to the relatively low impedance (Low Z) of the antenna 102. High impedance levels are about 500 ohms or more and relatively low impedance levels are about 50 ohms.

The shunt switches 212, 222, in combination with the 90-degree impedance phase shift and the resulting 180-degree reflection coefficient (e.g., impedance inversion) of the baluns 306, 330 substantially isolates the receiver 314 from transmission signals from the transmitter 338 during transmit mode while also substantially limiting the transmitter 338 from loading down the received signal during receive mode.

Figure 6:
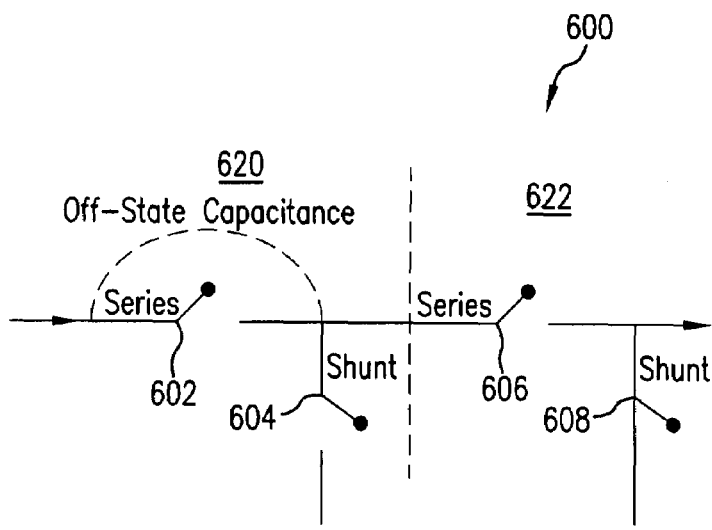
FIG. 6 shows a series and shunt combination of multiple radio frequency (RF) switch devices such as PIN diodes or GaAs MESFETs that comprise a typical prior art T/R switch.

The prior art T/R switch 104 described in FIG. 1 above required both a high attenuation factor when open and a very low resistance when closed. Further, the prior art T/R switch 104 also required very high power handling capabilities so as to efficiently conduct the full transmit power across the switch 104. FIG. 6 shows a series and shunt combination 600 of multiple RF switch devices 602, 604, 606, 608 that comprise a typical prior art T/R switch 104. The RF switch devices may be PIN diodes, GaAs MESFET transistors or MOSFET transistors. The series and shunt combination of multiple RF switch devices are combined in multiple sections 620, 622. Each of the multiple sections 620, 622 include one or more series switch (i.e., transistor 602 in section 620) and one or more shunt switches (i.e. transistor 604 in section 620). In operation, when the TR switch 104 is open, i.e., not conducting, the series switches 602, 606 are open and the shunt switches 604, 608 are closed. The open series switches 602, 606 significantly attenuate the signal on the signal path and the closed shunt switches 604, 608 couple any resulting signal to ground. For example, when the series switch 602 is in open condition (i.e. non-conducting) the open series switch 602 is not an actual electrical open but is actually a relatively a high capacitance capacitor. Therefore, the open series switch 602 may not fully block signals across the switch 602. The closed shunt switch 604 couples most (but not all) of any remaining signals to ground. However, the closed shunt switch 604 is a RF switch device and is therefore not a complete electrical short (i.e., 0 ohms conductor) to ground. As a result a portion of the signal is coupled to the input of the next series switch 606.

As described above, the prior art T/R switch 104 is very complex due to requiring multiple transistors. Further, if PIN diodes are used, devices 602, 606 require significant forward biasing current during closed (i.e., low attenuation) conditions while devices 604, 608 require significant current during open (i.e., high attenuation) conditions and is therefore very inefficient use of biasing current. As discussed above, many of the potential applications of a highly integrated transceiver are in portable devices that are powered by portable power supplies (i.e., batteries) of limited capacity. Therefore, power efficiency is a very important design characteristic. For these reasons, a T/R switch 104 comprised of PIN diodes and similar RF devices does not efficiently use the limited power available.

Referring again to FIG. 3 above, CMOS transistors can be used for the receive shunt switch 212 and the transmit shunt switch 222. CMOS transistors require only a small biasing voltage and zero (or near zero) biasing current to form a relatively low resistance conducting path. In at least one embodiment, a single shunt switch 212 can create a 2.5-ohm RF short. Further, because the receive shunt switch 212 and the transmit shunt switch 222 are connected as shunt switches, the shunt switches 212, 222 do not couple the respective signals but rather short the respective signals. Because the transmit shunt switch 222 does not couple the full transmit signal across the switch 222, the shunt switch 222 can be designed to couple a much smaller magnitude signal to achieve the effective signal shunting results. One embodiment includes on-chip, short and high quality factor elements in the single package environment (low-loss traces and dielectric) to realize the switch "open" condition.

Figure 7A:
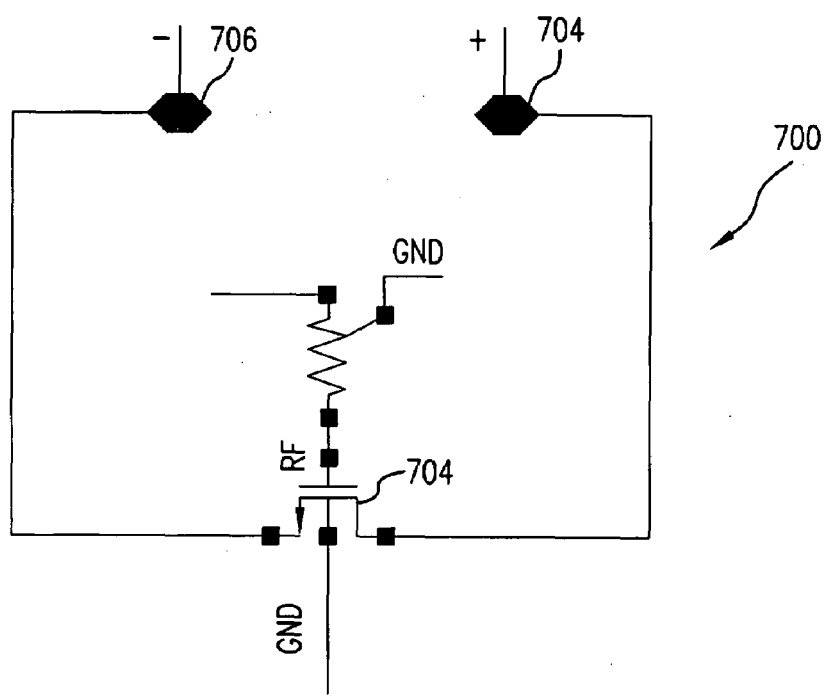
FIG. 7A shows a schematic of a CMOS shunt switch circuit such as the receive shunt switch and the transmit shunt switch according to one embodiment of the present invention.

FIG. 7A shows a schematic of a CMOS shunt switch circuit 700 such as the receive shunt switch 212 and the transmit shunt switch 222 according to one embodiment of the present invention. The shunt switch circuit 700 includes the CMOS shunt switch 704 that is coupled across differential terminals 704, 706. As a positive voltage is applied to the gate of the shunt switch 704 the shunt switch conducts across the source to drain and results in a very low resistance shunt connection across the differential terminals 704, 706.

Figure 7B:
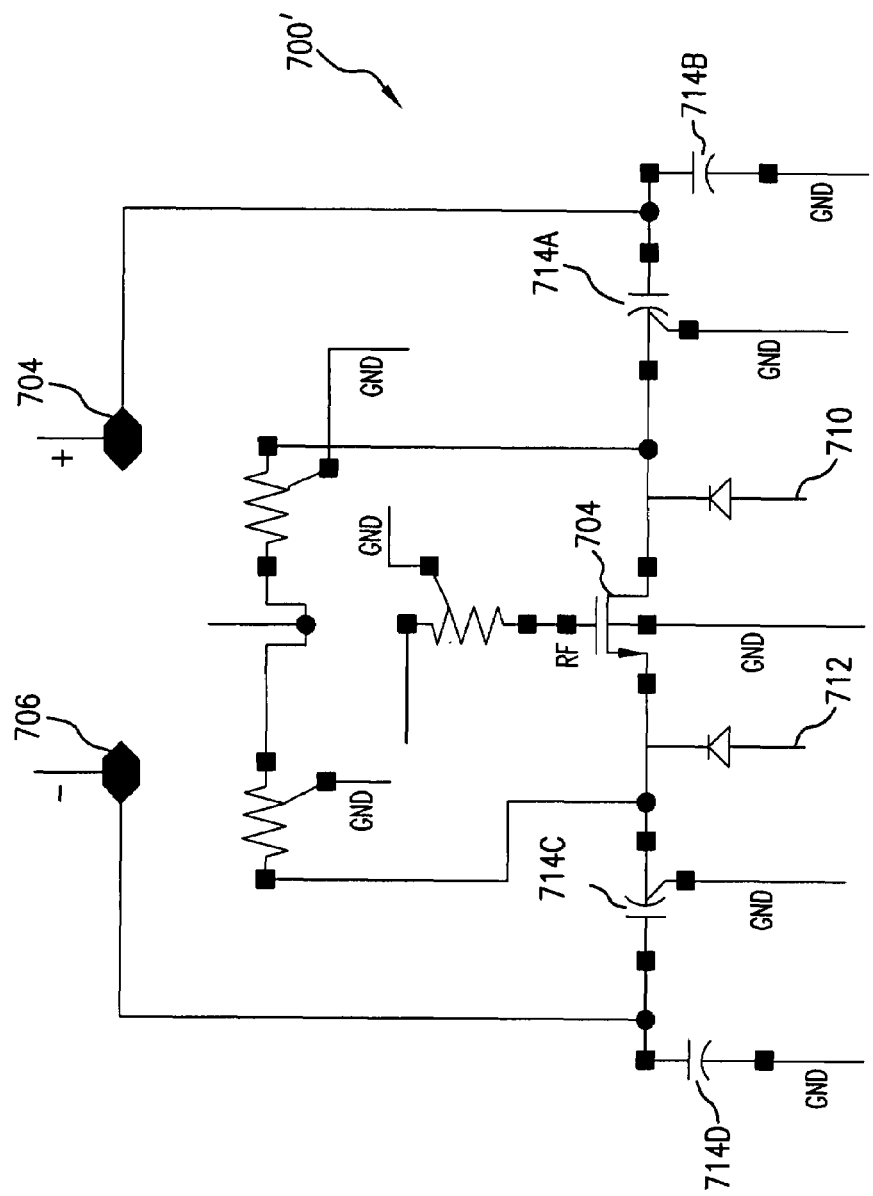
FIG. 7B shows a schematic of a CMOS shunt switch circuit such as the receive shunt switch and the transmit shunt switch according to another embodiment of the present invention.

FIG. 7B shows a schematic of a NMOS shunt switch circuit 700' such as the receive shunt switch 212 and the transmit shunt switch 222 according to another embodiment of the present invention. Inverters 710, 712 can apply reverse biasing voltages to increase the depletion zone within the CMOS shunt switch 704 when the NMOS switch 704 is in the open (i.e., non-conducting) mode. Increasing the depletion zone within the NMOS shunt switch 704 reduces the possibility that a high amplitude differential signal on the differential terminals 704, 706 can inadvertently forward bias the NMOS switch 704. One embodiment also includes capacitors 714A, 714B, 714C, 714D that can provide DC isolation so that any DC voltage applied to the differential terminals 704, 706 cannot inadvertently forward bias the drain/source diodes present in the NMOS switch 704. The DC isolation also allows the NMOS switch 704 circuit 700' to be designed relatively independently of the design of the LNA 312 and PA 336.

Figure 8:
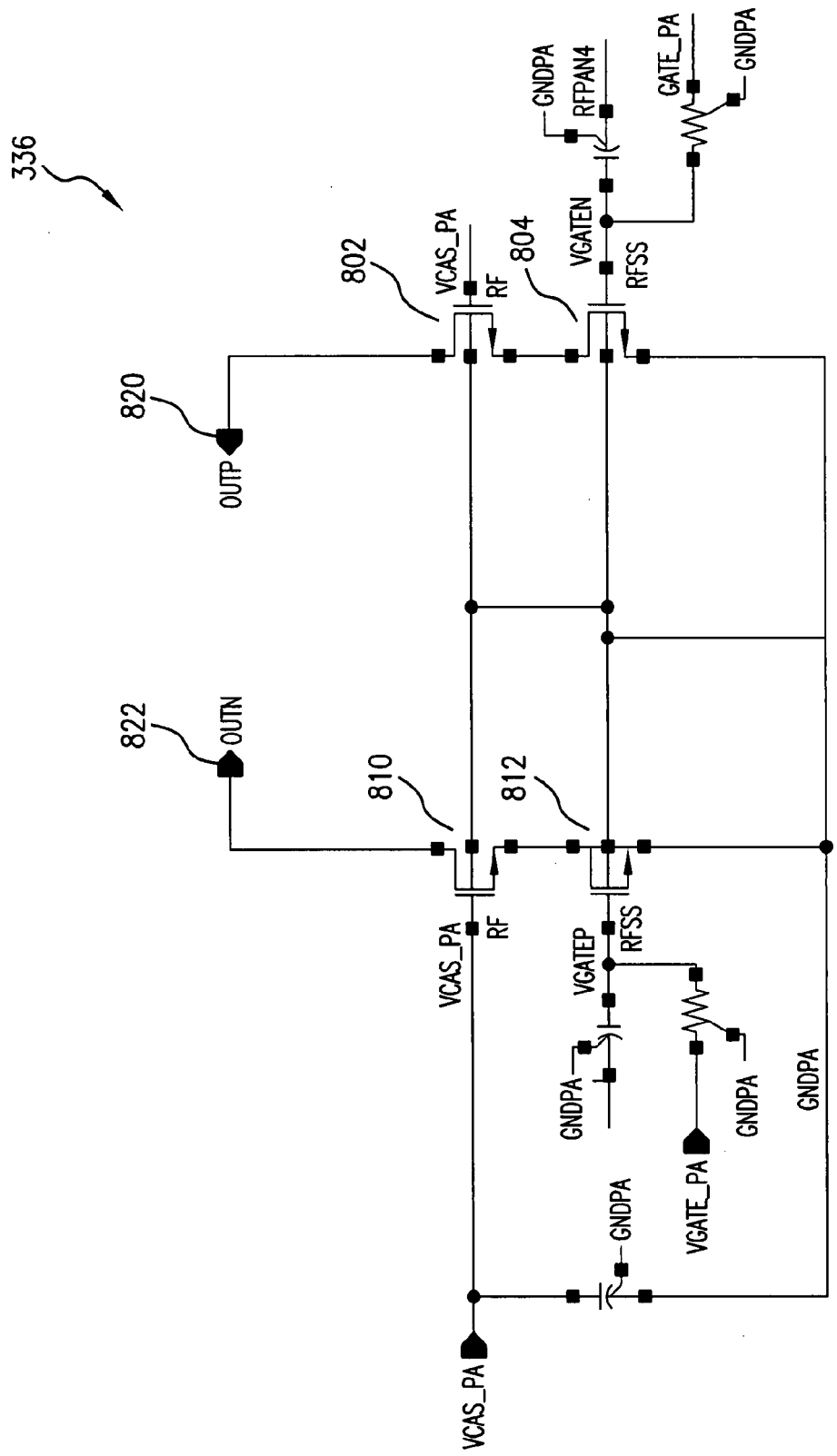
FIG. 8 illustrates a schematic of a PA according to one embodiment of the present invention.

FIG. 8 illustrates a schematic of a PA 336 according to one embodiment of the present invention. Amplifying transistors 802, 804 and matching amplifying transistors 810, 812 amplify the differential output signals and apply the resulting amplified signal to the differential output terminals 820, 822. In one embodiment, when the transceiver is the receive mode, the four transistors 802, 804, 810, 812 can be used as the transmit shunt switch 222. Biasing the four transistors 802, 804, 810, 812 to conduct results in a low resistance, shunt path between the two differential output terminals 820, 822. Using the four transistors 802, 804, 810, 812 as the transmit shunt switch 222 can obviate the need for separate shunt transistor 704 shown in FIGS. 7A and 7B above.

Figure 9A:
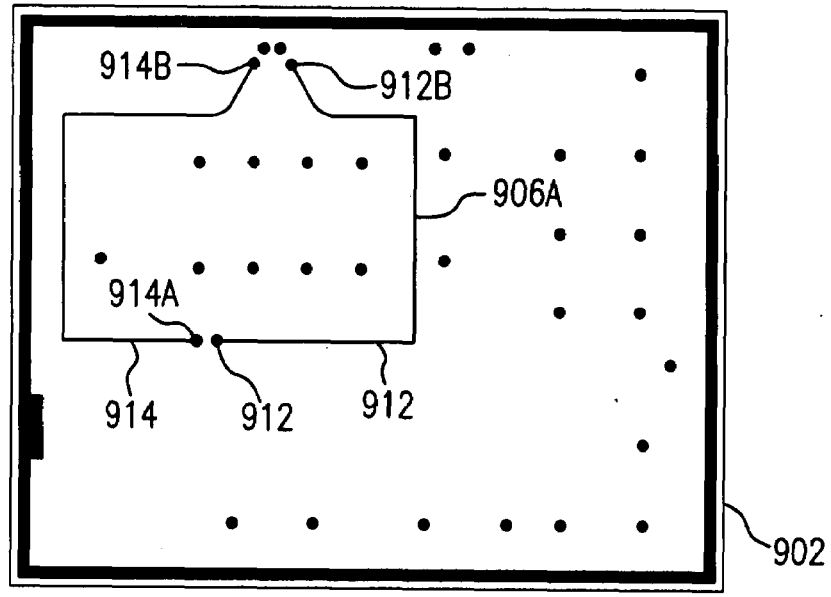
FIGS. 9A and 9B show a balun such as receiver balun of FIG. 3 above, according to one embodiment of the present invention.
Figure 9B:
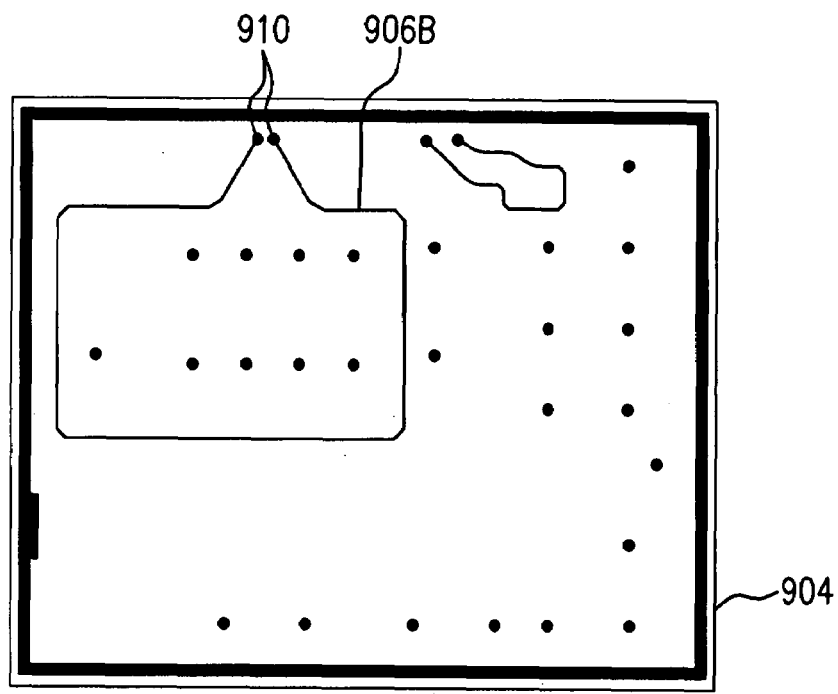

FIGS. 9A and 9B show a balun 900 such as receiver balun 306 of FIG. 3 above, according to one embodiment of the present invention. The balun 306 is formed in two, separate metal layers 902, 904 in a low temperature co-fired ceramic (LTCC) package. LTCC packaging enables size and cost reduction without sacrificing performance and allows for high-volume, low variability manufacturing. The low variability of the LTCC circuit components substantially eliminates "on board tuning" that is common in prior art transceiver front-end circuitry.

A dielectric layer (not shown) separates metal layers 902, 904. In the completed package, the two metal layers 902, 904 are placed on top of one another, such that line 906A is substantially vertically aligned with line 906B. Because lines 906A and 906B are aligned, a signal can be electromagnetically coupled from line 906A to line 906B. For example, if the unbalance antenna port 101 (shown in FIG. 3 above) is coupled to the input 910 terminals of line 906B, then the received signal can be electromagnetically coupled to the two equal length sections 912 and 914 of line 906A. Section 912 has two output terminals 912A, 912B. Section 914 has two output terminals 914A, 914B.

Figure 9C:
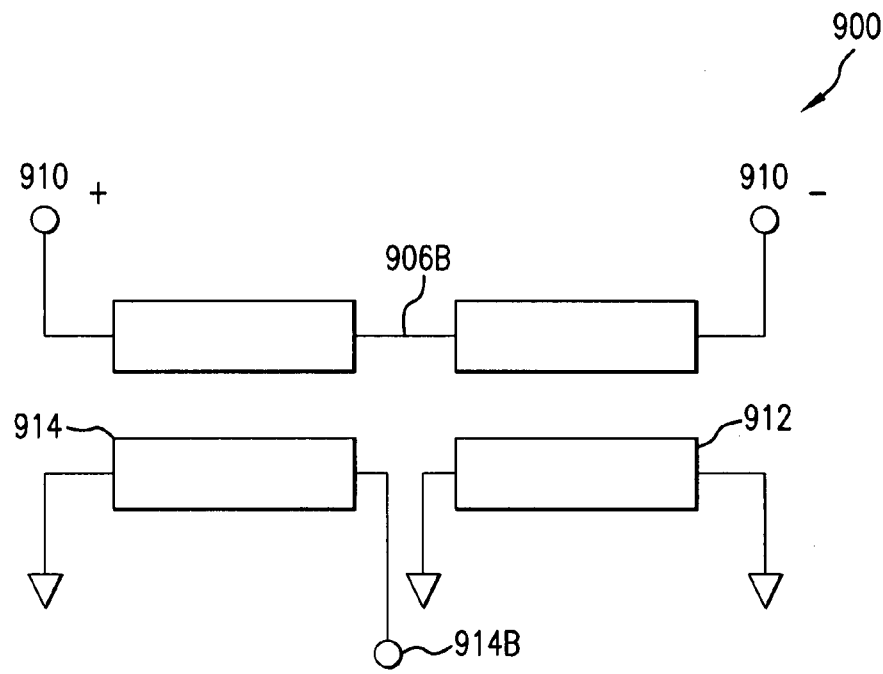
FIG. 9C shows a block diagram of the coupled line balun in accordance with one embodiment of the present invention.
Figure 9D:
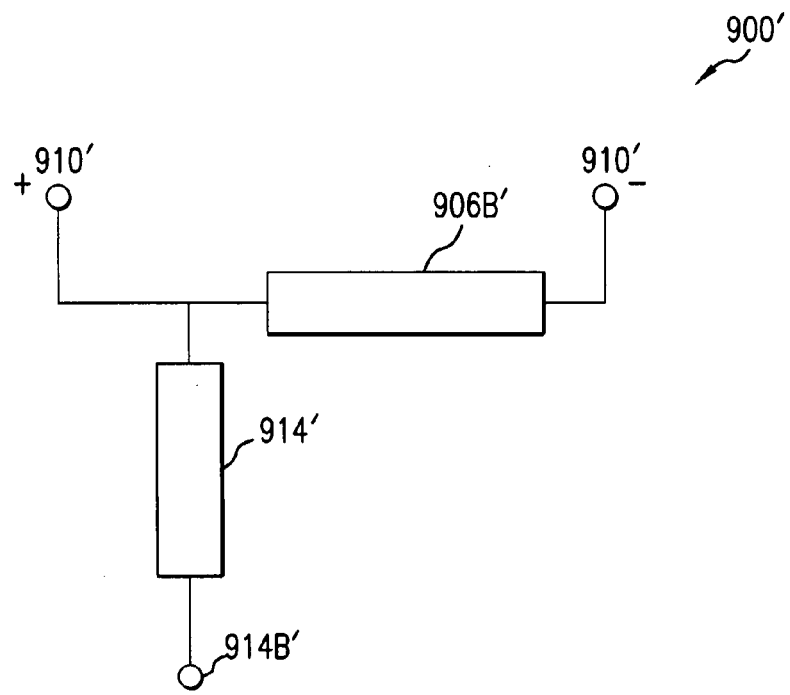
FIG. 9D shows a single-line equivalent circuit of the coupled line balun shown in FIG. 9C.

FIG. 9C shows a block diagram 900 of the coupled line balun 900 in accordance with one embodiment of the present invention. The balun 900 includes two quarter-wave coupled line sections 914, 912. Operation of the balun 900 can best be understood by considering an equivalent circuit. At the center frequency, this coupled line balun 900 has the single-line equivalent circuit 900' shown in FIG. 9D. The balanced terminals 910' are connected through a half-wavelength (180-degree) transmission line 906B'. The un-balanced line 914' is connected through a quarter-wavelength (90 degree) transmission line section. Because the balanced terminals are connected by a 180-degree transmission line, the signals taken at the output are substantially equal in magnitude and opposite in phase.

Transmit balun 330 operates similarly to electromagnetically combine differential transmit signals.

Figure 10:
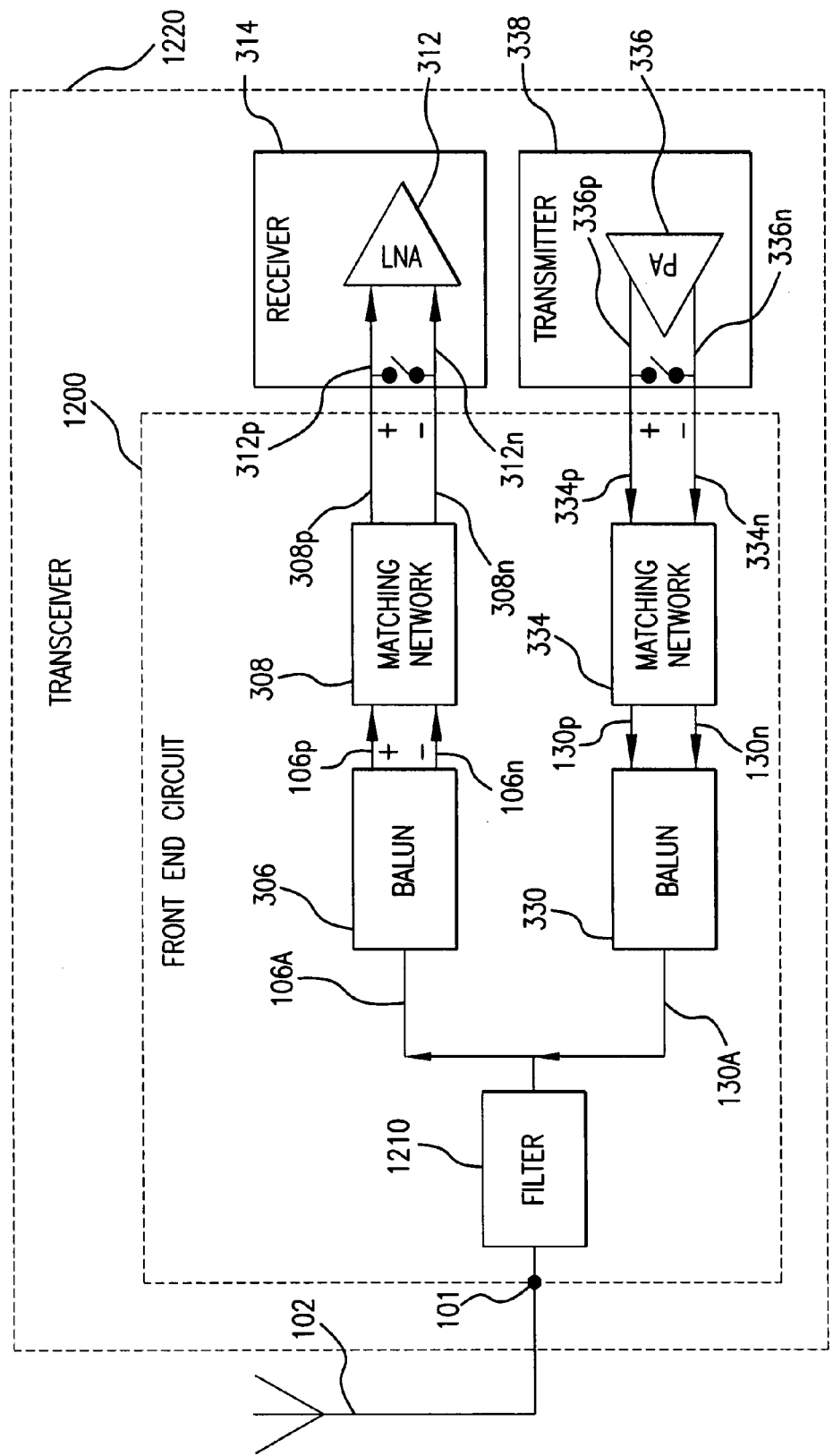
FIG. 10 shows a block diagram of a transceiver according to one embodiment of the present invention.

FIG. 10 shows a block diagram of a transceiver 1220 according to one embodiment of the present invention. The transceiver 1220 includes a filter 1210 in line with the antenna port 101 so as to be between the antenna port 101 and before the receive balun 306 in the receive signal path. The filter 1210 is also between the transmit balun 330 and the antenna port 101 in the transmit path. The filter 1210 can reduce transmission harmonics that can negatively impact the performance of the receiver LNA 312. The filter 1210 can be used as a band pass filter to pass only those frequencies desired to be output by the transmitter 338 and those frequencies desired to be input to the receiver 314.

By way of example, if the transceiver 1220 is a Bluetooth transceiver that is co-located with a cellular telephone such as a wireless headset for the cellular telephone, then the receiver 314 must be protected from the transmit signals that are output from the cellular telephone. The filter 1210 can be selected to block or reject the transmit signals from the cellular telephone so as to protect the receiver 314.

Figure 11:
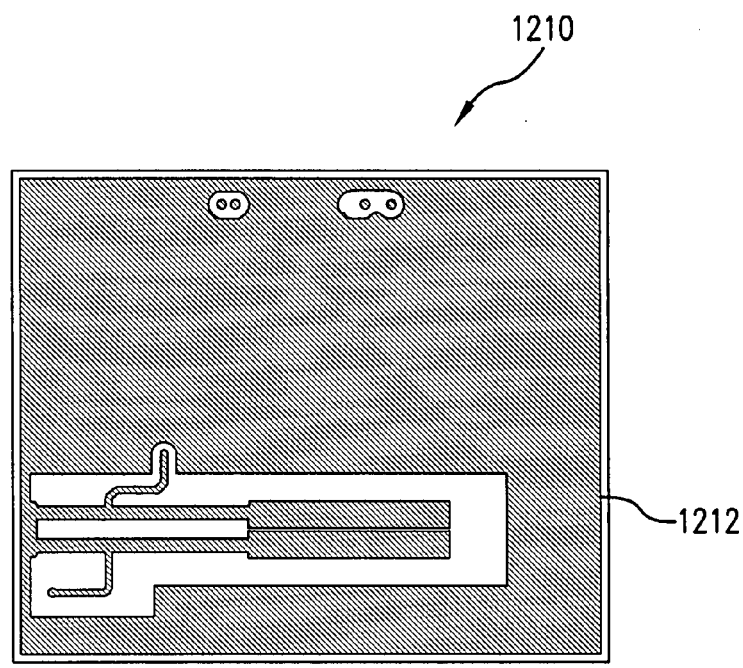
FIG. 11 shows an antenna filter according to one embodiment of the present invention.

FIG. 11 shows an antenna filter 1210 according to one embodiment of the present invention. In one embodiment the antenna filter 1210 is formed as a strip line filter in a metal layer within a package such as an LTCC package. The LTCC package provides a high-queue, low-loss package environment such that the strip line filter can be tuned to substantially reject a selected signal such as the PCS cellular and other bands rejection. The filter 1210 can be a stepped impedance comb-line filter. Alternatively, the filter 1210 can be external to the package such as one or more surface mount components or other types of filter and filter networks that are well known in the art.

Figure 12:
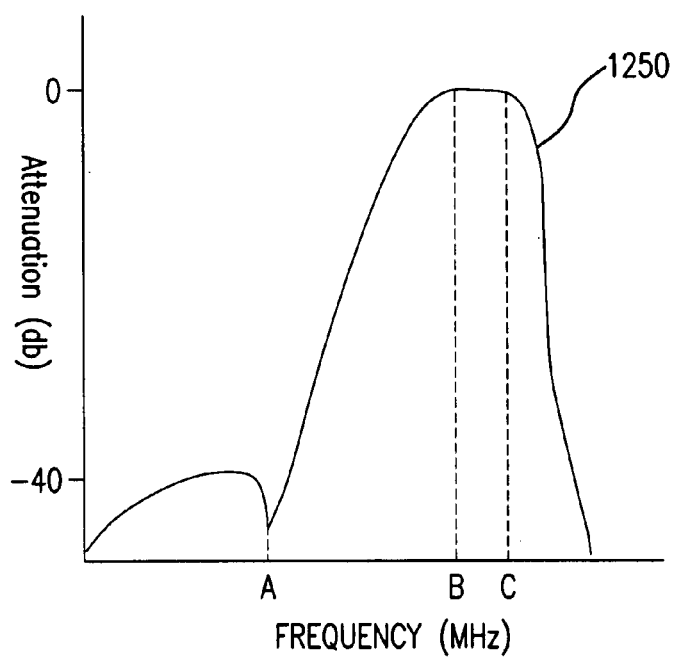
FIG. 12 shows an example attenuation curve for a filter according to one embodiment of the present invention.

The filter 1210 can suppress transmit harmonics from the transmitter 338 and also attenuate other frequency bands that could reduce the effectiveness of the receiver 314. FIG. 12 shows an example attenuation curve 1250 for a filter 1210 according to one embodiment of the present invention. Curve 1250 shows that filter 1210 attenuates frequencies around frequency A at about −40 db. A frequency band (band$_{BC}$) between frequency B and frequency C is substantially not attenuated (i.e., approximately 0 db attenuation). If the receive and transmit frequencies of the receiver 314 and transmitter 338 fall within band$_{BC}$ then those frequencies are passed through the filter 1210 largely unattenuated. If frequency A identifies a desired reject frequency or frequency band such as the PCS frequency band, then the PCS frequency bad would be attenuated by a factor of more than about 40 db, effectively rejecting the PCS frequency band.

In one embodiment, the strip line filter 1210 is approximately one-quarter wavelength of the center frequency in a desired band (i.e. band$_{BC}$) in length. The filter 1210 can also provide a DC path to ground 1212. Including a DC path to ground aids in protecting electronic devices and components, such as CMOS devices, from electrostatic discharge (ESD).

Other LTCC components can also provide ESD protection. By way of example, the baluns 306, 330 and matching networks 308, 334 can also decouple DC spikes due to the close physical proximity of the devices to a ground potential. LTCC components can thereby provide sufficient ESD protection without the need for dedicated ESD decoupling devices. Dedicated ESD decoupling devices can decrease sensitivity of receiver LNA 312 and efficiency transmitter PA 336.

Figure 13:
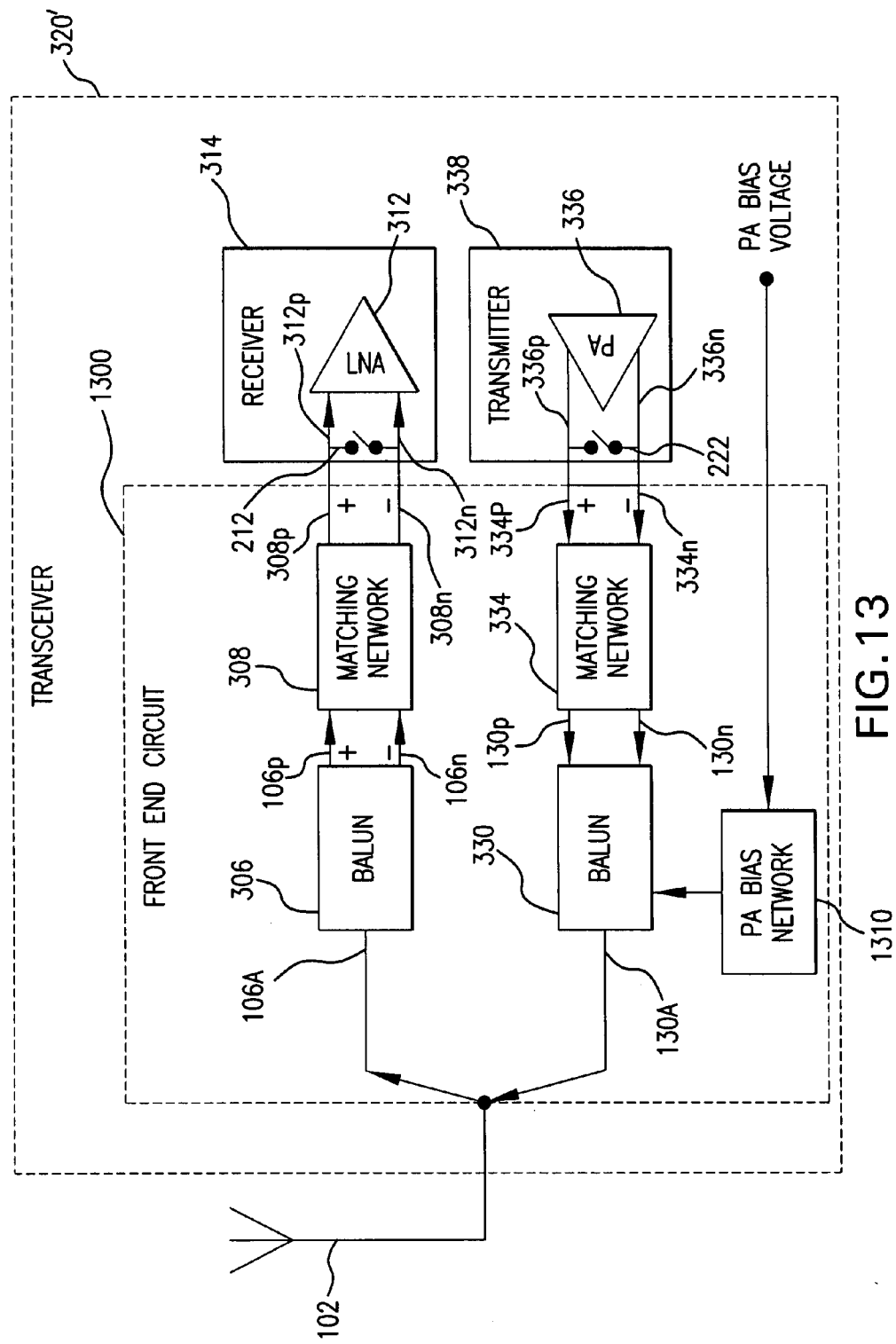
FIG. 13 illustrates a front-end circuit, receiver and transmitter portions of a transceiver according to one embodiment of the present invention.

FIG. 13 illustrates a front-end circuit 1300, receiver 314 and transmitter 338 portions of a transceiver 320 according to one embodiment of the present invention. A PA bias network 1310 can also be included in the LTCC package. The PA bias network 1310 allows the PA bias voltage to be directed through the LTCC package, external of the transmitter 338, thus allowing tuning of the PA bias within the LTCC package. The PA bias network 1310 allows the PA bias voltage to be directed through components in the front-end circuit 1300 such as through the transmitter matching network 334 and/or through the transmitter balun 330.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A transceiver front end circuit comprising:
    an antenna terminal capable of being coupled to an antenna;
    a first balun circuit having a single input coupled to the antenna terminal and a pair of balanced outputs coupled to a corresponding pair of balanced receiver inputs, the first balun circuit matching an input impedance of the pair of balanced receiver inputs and substantially phase shifting an input reflection coefficient of the pair of balanced receiver inputs by about 180-degrees;
    a second balun circuit having a single output coupled to the antenna terminal and a pair of balanced inputs coupled to a corresponding pair of balanced transmitter outputs, the second balun circuit matching an output impedance of the pair of balanced transmitter outputs and substantially phase shifting an output reflection coefficient of the pair of balanced transmitter outputs by about 180-degrees and the first balun circuit and the second balun circuit being contained within a single package;
    a first shunt switch coupled across the pair of receiver inputs, including a first transistor coupled across the pair of receiver inputs, and a means for increasing a depletion zone of the first transistor when the first shunt switch is open; and
    a second shunt switch coupled across the pair of transmitter outputs, including a second transistor coupled across the pair of transmitter outputs, and a means for increasing a depletion zone of the second transistor when the second shunt switch is open.

2. The circuit of claim 1, wherein the first transistor and the second transistor are CMOS transistors.

3. The circuit of claim 1, wherein the single package is a low temperature co-fired ceramic (LTCC) package.

4. The circuit of claim 1, wherein the first transistor is included in the pair of receiver inputs.

5. The circuit of claim 1, wherein the second transistor is included in the pair of transmitter outputs.

6. The circuit of claim 1, wherein the second transistor includes at least one output stage of a transmitter output amplifier.

7. The circuit of claim 1, further comprising a filter including a filter input coupled to the antenna terminal, and a filter output coupled to the input of the first balun circuit and the output of the second balun circuit.

8. The circuit of claim 7, wherein the filter is disposed within the single package.

9. The circuit of claim 7, wherein the filter attenuates undesired signals at least about 35 decibels.

10. The circuit of claim 7, wherein the filter is a strip line filter.

11. The circuit of claim 1, wherein the antenna terminal has a about 50 ohm impedance.

12. The circuit of claim 11, wherein if the first shunt switch is closed the input to the first balun circuit has an input impedance substantially greater than about 50 ohms.

13. The circuit of claim 11, wherein if the first shunt switch is open the input to the first balun circuit has an input impedance substantially equal to about 50 ohms.

14. The circuit of claim 11, wherein if the second shunt switch is closed the output of the second balun circuit has an impedance is substantially greater than about 50 ohms.

15. The circuit of claim 11, wherein if the second shunt switch is open the output of the second balun circuit has an impedance substantially equal to about 50 ohms.

16. A method of switching between a receive mode and a transmit mode comprising:
    coupling an input of a first balun circuit to an antenna terminal and coupling a pair of outputs of the first balun circuit to a corresponding pair of balanced receiver inputs, the first balun circuit matching an input impedance of the pair of balanced receiver inputs and substantially phase shifting an input reflection coefficient of the pair of balanced receiver inputs by about 180-degrees;

coupling an output of a second balun circuit to the antenna terminal and coupling a pair of inputs of the second balun circuit to a corresponding pair of balanced transmitter outputs, the second balun circuit matching an output impedance of the pair of balanced transmitter outputs and substantially phase shifting an output reflection coefficient of the pair of balanced transmitter outputs by about 180-degrees the first balun circuit and the second balun circuit being contained within a single package;

shorting the pair of receiver inputs during a transmit mode, wherein shorting the pair of receiver inputs includes closing a first transistor coupled across the pair of receiver inputs;

shorting the pair of transmitter outputs during a receive mode, wherein shorting the pair of transmitter outputs includes closing a second transistor coupled across the pair of transmitter outputs; and increasing a depletion zone for the first transistor during the receive mode, and increasing a depletion zone for the second transistor during the transmit mode.

17. The method of claim 16, wherein if the first transistor is closed the input to the first balun circuit has an impedance substantially greater to an impedance of the antenna terminal.

18. The method of claim 16, wherein if the first transistor is open the input to the first balun circuit has an impedance substantially equal an impedance of the antenna terminal.

19. The method of claim 16, wherein if the second transistor is closed the output of the second balun circuit has an impedance is substantially greater than an impedance of the antenna terminal.

20. The method of claim 16, wherein if the second transistor is open the output of the second balun circuit has an impedance substantially equal to an impedance of the antenna terminal.

21. The method of claim 16, wherein the first transistor and the second transistor are CMOS transistors.

22. The method of claim 16, further comprising filtering a signal between the antenna terminal and a second terminal, the second terminal being coupled to the input of the first balun circuit and the output of the second balun circuit.

23. The method of claim 22, wherein the filter attenuates undesired signals at least about 35 decibels.

* * * * *

UNITED STATES PATENT AND TRADEMARK OFFICE
CERTIFICATE OF CORRECTION

PATENT NO. : 7,283,793 B1
APPLICATION NO. : 10/262336
DATED : October 16, 2007
INVENTOR(S) : Tom McKay It is certified that error appears in the above-identified patent and that said Letters Patent is hereby corrected as shown below:

At column 14, line 47, "has a about 50 ohm" should be replaced by --has about a 50 ohm--.

At column 14, line 57, "impedance is substantially greater than about 50 ohms" should be replaced by --impedance that is substantially greater than about 50 ohms--.

At column 16, line 10, "an impedance is substantially greater than" should be replaced by --impedance that is substantially greater than--.

Signed and Sealed this

Seventeenth Day of June, 2008

JON W. DUDAS
*Director of the United States Patent and Trademark Office*